United States Patent [19]

Masuda

[11] Patent Number: 5,777,306

[45] Date of Patent: Jul. 7, 1998

[54] CREDIT CARD SYSTEM AND METHOD OF USING CREDIT CARD WITH SUCH CREDIT CARD SYSTEM

[75] Inventor: Hidehiro Masuda, Tokyo, Japan

[73] Assignee: Nippon Shinpan Coi., Ltd., Tokyo, Japan

[21] Appl. No.: 628,866

[22] Filed: Apr. 5, 1996

[30] Foreign Application Priority Data

May 2, 1995 [JP] Japan ................... 7-131206

[51] Int. Cl.$^6$ .................................................. G06K 5/00
[52] U.S. Cl. ........................ 235/380; 235/379; 235/487
[58] Field of Search .................................. 235/379, 380, 235/487

[56] References Cited

U.S. PATENT DOCUMENTS

| | | | |
|---|---|---|---|
| 4,812,628 | 3/1989 | Boston et al. | 235/379 |
| 5,177,342 | 1/1993 | Adams | 235/379 |
| 5,569,897 | 10/1996 | Masuda | 235/380 |

FOREIGN PATENT DOCUMENTS

| | | |
|---|---|---|
| 62-264360 | 11/1987 | Japan . |
| 64-31266 | 2/1989 | Japan . |
| 3-109693 | 5/1991 | Japan . |
| 3-228199 | 10/1991 | Japan . |

*Primary Examiner*—Harold Pitts
*Attorney, Agent, or Firm*—Fish & Richardson P.C.

[57] ABSTRACT

A credit card system has a card having at least identification information and management information recorded thereon, a first system for determining whether a credit card can be used or not, and a second system for determining whether the credit card can be used or not. The first system has a communication device for communicating with the second system, a card reader for reading the identification information and the management information recorded on the credit card, and a system processor for determining whether the credit card can be used or not, and judging whether usability of the credit card is to be determined by the first system or the second system based on the management information recorded on the credit card. The system processor indicates or displays resultant data as to whether the credit card can be used or not as determined by the first system if usability of the credit card is to be determined by the first system, and inquires the second system about usability of the credit card through the communication device if usability of the credit card is to be determined by the second system, and indicates or displays resultant data as to whether the credit card can be used or not as determined by the second system.

8 Claims, 5 Drawing Sheets

FIG. 3

| MEMBER MASTER FILE |
|---|
| ID INFORMATION |
| MEMBER NUMBER<br><br>CARD NUMBER<br><br>NAME<br><br>ADDRESS<br><br>DATE OF BIRTH<br><br>TELEPHONE NUMBER |
| CREDIT INFORMATION |
| LIMIT AMOUNT OF MONEY<br><br>REMAINING AMOUNT OF MONEY AVAILABLE<br><br>HISTORY OF PAST PAYMENTS<br><br>INVALID DATA |
| ACCOUNT INFORMATION |
| ACCOUNT NUMBER<br><br>BANK NAME<br><br>BRANCH NAME<br><br>ACCOUNT TYPE |

CREDIT CARD SYSTEM AND METHOD OF USING CREDIT CARD WITH SUCH CREDIT CARD SYSTEM

BACKGROUND OF THE INVENTION

1. Field of the Invention

The present invention relates to a credit card system for using credit cards in selling goods and services (hereinafter collectively referred to as "goods") and a method of using credit cards with such a credit card system, and more particularly to a system for issuing credit cards to customers with ease.

2. Description of the Related Art

At present, it is very popular for customers to pay for goods with credit cards. According to a conventional credit card issuing process, a customer needs to have a credit card before he buys goods on credit. Specifically, the customer sends an filled-out application form to a credit company either directly or via a retail store, and the credit company then checks the application. The credit company usually sets a limit amount of money for the customer, and issues a credit card with information about the limit amount of money to the customer. After having received the credit card, the customer can purchase goods with the credit card simply by signing a slip insofar as the amount of money which the customer is going to pay for the purchased goods is less than the limit amount of money. The customer is not required to apply for the issuance of a credit card each time he buys individual goods, and the retail store where the user buys goods only needs to go through a simple procedure for checking the limit amount of money set for the user and the history of past payments by the user for the goods purchased on credit.

According to the above conventional credit card issuing process, the credit company conducts a detailed creditability examination before issuing the credit card to the customer, then makes a member master file of the customer in its credit card management system, and registers the customer's name, address, creditability information, and the limit amount of money among other information. Such a member master file is usually produced by a batch process that is carried out at certain intervals of time. Therefore, it takes a certain period of time until a member master file is completed. Another problem is that it takes many days for a customer to receive a credit card that has been applied for because of the time required for the credit company to produce the credit card and the time required for the credit company to mail the credit card to the customer.

Attempts have been made to issue a credit card to a customer immediately on site. However, because no sufficient credit sale management is available for the customer before his member master file is created in the credit company, such an approach is subject to a risk in credit sale and poses problems especially when selling goods costing a large amount of money or selling goods repeatedly on credit. One solution would be to immediately register the customer information in the member master file, but would be difficult to adopt as it would necessitate extensive modifications and adjustments of the credit card management system and its operation rules. Efforts have also been made to give a customer a temporary credit card on site. However, such a temporary credit card has only permitted the customer to purchase goods on credit for a relatively small amount of money on a temporary basis in order to avoid a risk in credit sale.

As described above, the conventional credit card issuing process has been disadvantageous in that it is time-consuming to create a member master file and it takes many days until a credit card is actually available to a customer, and has posed limitations on the immediate issuance of a credit card to a customer who wishes to buy goods on credit.

SUMMARY OF THE INVENTION

It is therefore an object of the present invention to provide a credit card system which allows a retail store or a credit company to issue a credit card to a customer immediately upon application, permits the customer to use the issued credit card continuously, and assures highly safe credit sale with the issued credit card.

Another object of the present invention is to provide a method of using a credit card with such a credit card system.

To achieve the above object, there is provided in accordance with the present invention a credit card system comprising a card having at least identification information and management information recorded thereon, a first system for determining whether a credit card can be used or not, and a second system for determining whether the credit card can be used or not, the first system comprising communication means for communicating with the second system, reader means for reading the identification information and the management information recorded on the credit card, decision means for determining whether the credit card can be used or not, judgment means for judging whether usability of the credit card is to be determined by the first system or the second system based on the management information recorded on the credit card, and means for indicating or displaying resultant data as to whether the credit card can be used or not as determined by the decision means if the judgment means judges that usability of the credit card is to be determined by the first system, and for inquiring the second system about usability of the credit card through the communication means if the judgment means judges that usability of the credit card is to be determined by the second system, and indicating or displaying resultant data as to whether the credit card can be used or not as determined by the second system. The management information may comprise date information recorded on the credit card, or limit amount information recorded on the credit card.

According to the present invention, there is also provided a credit card system comprising a card having at least identification information recorded thereon, a first system for determining whether a credit card can be used or not, and a second system for determining whether the credit card can be used or not, the first system comprising communication means for communicating with the second system, reader means for reading the identification information recorded on the credit card, memory means for storing management information of the credit card, decision means for determining whether the credit card can be used or not, judgment means for judging whether usability of the credit card is to be determined by the first system or the second system based on the management information stored in the memory means, and inquiring the second system about usability of the credit card through the communication means if usability of the credit card is to be determined by the second system, and means for indicating or displaying resultant data as to whether the credit card can be used or not as determined by the decision means if the judgment means judges that usability of the credit card is to be determined by the first system, and for inquiring the second system about usability of the credit card through the communication means if the judgment means judges that usability of the credit card is to be determined by the second system, and indicating or displaying resultant data as to whether the credit card can be used or not as determined by the second system. The management information may comprise date information recorded on the credit card, or limit amount information recorded on the credit card.

According to the present invention, there is further provided a credit card system comprising a card having at least identification information recorded thereon, a first system for determining whether a credit card can be used or not, and a second system for managing information to determine whether the credit card can be used or not, the first system comprising communication means for communicating with the second system, reader means for reading the identification information recorded on the credit card, decision means for determining whether the credit card can be used or not, inquiry means for inquiring the second system about usability of the credit card through the communication means, judgment means for judging whether usability of the credit card is to be determined by the first system or not based on the information managed by the second system, and means for indicating or displaying resultant data as to whether the credit card can be used or not as determined by the decision means if the judgment means judges that usability of the credit card is to be determined by the first system based on the response from the second system after the inquiry means inquires the second system about usability of the credit card through the communication means, and for indicating or displaying resultant data as to whether the credit card can be used or not as determined by the second system if the judgment means judges that usability of the credit card is not to be determined by the first system.

In each of the credit card systems, the credit card and/or the first system may have a limit amount column for recording a limit amount of money. Each of the credit card systems may further comprise means for updating the limit amount of money recorded in the limit amount column as the credit card is used, the decision means comprising means for determining whether the credit card can be used or not based on resultant data produced by comparison between the limit amount of money recorded in the limit amount column and an amount to money proposed to pay with the credit card.

According to the present invention, there is provided a method of using a credit card with a credit card system, the credit card system comprising a first system for primarily managing justifiability of a credit card, a second system for primarily managing credit information of a customer, and a credit card having storage means for storing at least identification information and management information therein, the first system comprising communication means for communicating with the second system, reader means for reading the identification information and the management information stored in the storage means of the credit card, decision means for determining whether the credit card can be used or not, and judgment means for judging whether usability of the credit card is to be determined by the first system or not based on the management information stored in the storage means of the credit card, the method comprising the steps of indicating or displaying resultant data as to whether the credit card can be used or not as determined by the decision means if the judgment means judges that usability of the credit card is to be determined by the first system, and inquiring the second system about usability of the credit card through the communication means if the judgment means judges that usability of the credit card is to be determined by the second system, and indicating or displaying resultant data as to whether the credit card can be used or not as determined by the second system.

According to the present invention, there is also provided a method of using a credit card with a credit card system, the credit card system comprising a first system for primarily managing justifiability of a credit card, a second system for primarily managing credit information of a customer, and a credit card having storage means for storing at least identification information therein, the first system comprising communication means for communicating with the second system, reader means for reading the identification information stored in the storage means of the credit card, memory means for storing management information of each credit card, decision means for determining whether the credit card can be used or not, and judgment means for judging whether usability of the credit card is to be determined by the first system or not based on the management information stored in the storage means of the credit card, the method comprising the steps of indicating or displaying resultant data as to whether the credit card can be used or not as determined by the decision means if the judgment means judges that usability of the credit card is to be determined by the first system, and inquiring the second system about usability of the credit card through the communication means if the judgment means judges that usability of the credit card is to be determined by the second system, and indicating or displaying resultant data as to whether the credit card can be used or not as determined by the second system.

According to the present invention, there is further provided a method of using a credit card with a credit card system comprising a card having at least identification information recorded thereon, a first system for determining whether a credit card can be used or not, and a second system for managing information to determine whether the credit card can be used or not, the first system comprising communication means for communicating with the second system, reader means for reading the identification information recorded on the credit card, decision means for determining whether the credit card can be used or not, inquiry means for inquiring the second system about usability of the credit card through the communication means, and judgment means for judging whether usability of the credit card is to be determined by the first system or not based on the decision of the second system, the method comprising the steps of indicating or displaying resultant data as to whether the credit card can be used or not as determined by the decision means if the judgment means judges that usability of the credit card is to be determined by the first system based on the response from the second system after the inquiry means inquires the second system about usability of the credit card through the communication means, and indicating or displaying resultant data as to whether the credit card can be used or not as determined by the second system if the judgment means judges that usability of the credit card is not to be determined by the first system.

In each of the above methods, the credit card and/or the first system may have a limit amount column for recording a limit amount of money, and the first system may further comprise means for updating the limit amount of money recorded in the limit amount column as the credit card is used. Each of the methods may further comprise the step of determining whether the credit card can be used or not based on resultant data produced by comparison between the limit amount of money recorded in the limit amount column and an amount to money proposed to pay with the credit card.

According to one basic aspect of the present invention, in the first system which manages justifiability of the credit card, the judgment means judges whether usability of the credit card is to be determined by the first system or the second system based on the management information stored in the memory means of the first system or the credit card. If the judgment means judges that usability of the credit card is to be determined by the first system, then the decision means determines whether the credit card can be used or not, and resultant data are indicated or displayed. If the judgment means judges that usability of the credit card is to be determined by the second system, then the second system is inquired about usability of the credit card through the communication means, and resultant data as to whether the credit card can be used or not as determined by the second system are indicated or displayed.

According to another basic aspect of the present invention, the inquiry means of the first system inquires the second system about usability of the credit card through the communication means. If the first system is to determine whether the credit card can be used or not as judged by the judgment means depending on the answer from the second system, the decision means of the first system determines whether the credit card can be used or not, and resultant data are indicated or displayed. If the first system is not to determine whether the credit card can be used or not as judged by the judgment means depending on the answer from the second system, then the second system determines whether the credit card can be used or not, and resultant data are indicated or displayed.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing a member master file used in a second system of the credit card system shown in FIG. 1;

DETAILED DESCRIPTION OF THE PREFERRED EMBODIMENT

Figure 1:
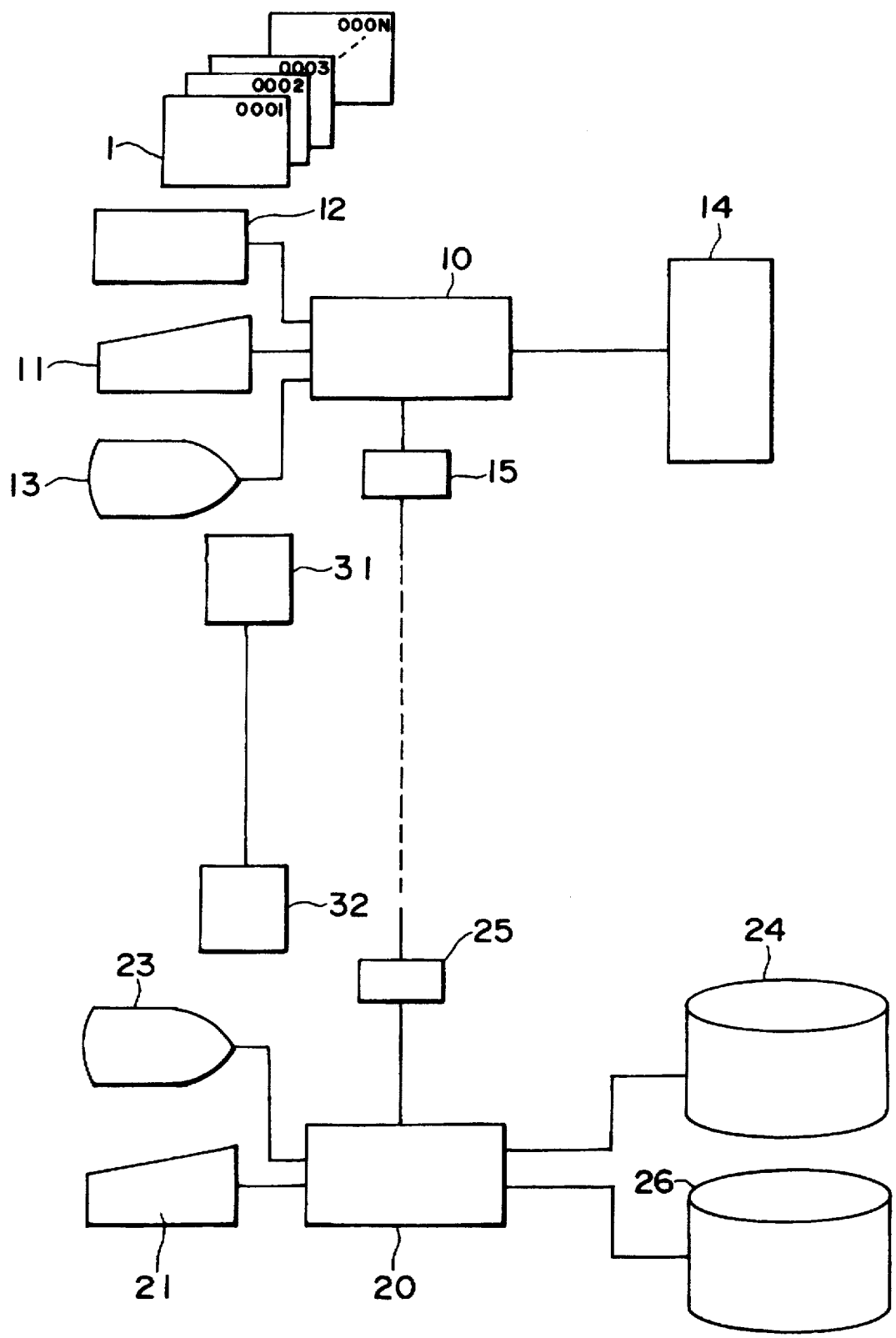
FIG. 1 is a block diagram of a credit card system according to an embodiment of the present invention.
Figure 2:
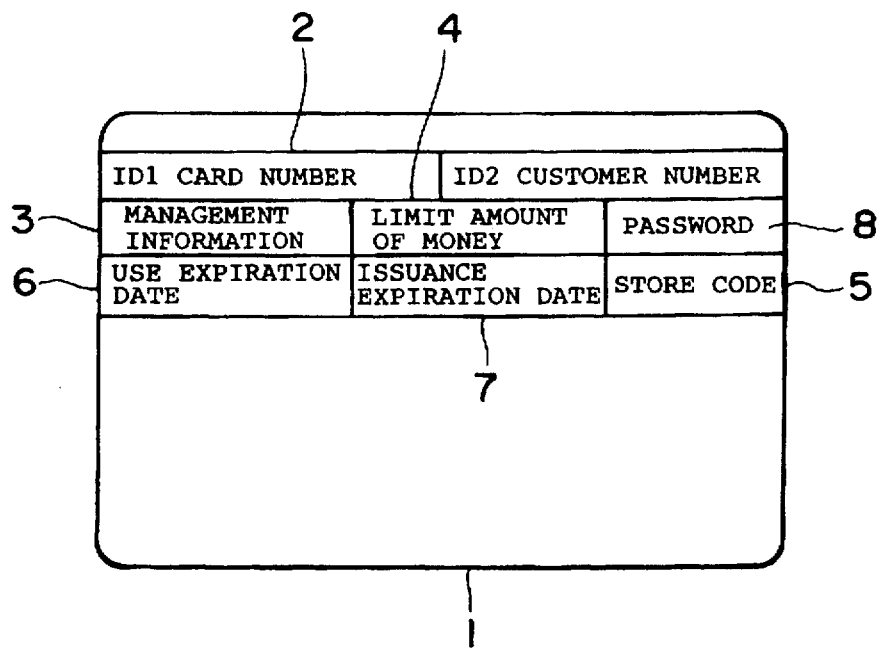
FIG. 2 is a view of a credit card used in the credit card system shown in FIG. 1.

As shown in FIGS. 1 and 2, a credit card system according to an embodiment of the present invention issues credit cards 1 each having an identification information column 2 (see FIG. 2) for recording an ID1 card number and an ID2 customer number, a management information column 3 for recording management information, a limit amount column 4 for recording a limit amount of money up to which the customer can pay with the credit card, a store code column 5 for recording information of a retail store in which the credit card can be used, a use expiration date column 6 for recording an date on which the use of the credit card expires, an issuance expiration date column 7 for recording a date on which the issuance of the credit card expires, and a password column 8 for recording a password established by the customer who owns the credit card 1.

The credit card system shown in FIG. 1 comprises a first system installed in a retail store for selling goods on credit and a second system installed in a credit company as a large credit information management system for managing credit information. The credit card system includes a first system processor 10 associated with the first system, a keyboard 11 connected to the first system processor 10, a card reader/writer 12 connected to the first system processor 10, a display unit 13 connected to the first system processor 10, a memory 14 connected to the first system processor 10, a communication adapter 15 connected to the first system processor 10, a second system processor 20 associated with the second system, a keyboard 21 connected to the second system processor 20, a display unit 23 connected to the second system processor 20, a pair of memories 24, 26 connected to the second system processor 20, a communication adapter 25 connected to the second system processor 20, a facsimile device 31 associated with the first system, and a facsimile device 32 associated with the second system. The communication adapters 15, 25 are connected to each other for on-line communications, and the facsimile devices 31, 32 are connected to each other for off-line communications.

The credit cards 1 to be issued by the credit card system are stocked in the retail store. Identification information, e.g., numbers from 0001 to 000N, for the respective credit cards 1 are registered in the first identification information columns 2 of the credit cards 1. In the illustrated credit card system, the credit cards 1 comprises IC (Integrated Circuit) credit cards, and the identification information and other information are recorded in a certain area of memories of the credit cards 1. Term information as management information, a limit amount of money, a store code, a use expiration date, and an issuance expiration date are recorded respectively in the columns 3, 4, 5, 6, 7 of each of the credit cards 1. The password of a customer is registered in the password column 8 when the credit card 1 is issued.

When a customer desires the purchase of goods on credit in a retail store, the person in charge in the retail store obtains information such as the name, sex, date of birth, etc. of the customer, assigns a credit card 1 with a certain identification number, e.g., 0001, recorded thereon, to the customer, and inquires, with the identification number, the second system about the credibility of the customer. The inquiry may be made on-line through the communication adapters 15, 25 or off-line through the facsimile devices 31, 32.

In response to the inquiry, the second system searches files stored in the memories 24, 26 for the credibility of the customer. If the customer has good credibility and the credit sale is allowable, then the second system indicates, to the first system, the permission of the issuance of the credit card and prepares for creating a member master file and registering necessary information in the member master file, as shown in FIG. 3.

When the person in charge in the retail store who is operating the first system is notified of the permission of the issuance of the credit card 1, the person in charge selects a mode of new card issuance, and inserts the credit card 1 to be issued into the card reader/writer 12. The first system processor 10 checks the expiration dates, the limit amount of money, and the store code of the credit card 1, and displays a prompt on the display unit 13 to enter the identification number of the customer. When the person in charge enters the identification number of the customer through the keyboard 11, the first system processor 10 records a certain date ahead of the date of issuance, e.g., a date two weeks ahead of the date of issuance, in the management information column 3 of the credit card 1 and also records a use expiration date in the use expiration date column 6 of the credit card 1. Thereafter, the first system allows the credit card 1 to be issued.

Instead of recording a use expiration date in the use expiration date column 6, the first system may record a numerical value representing an infinite period in the use expiration date column 6. Alternatively, the credit card 1 may dispense with the expiration date column 6 so that the credit card 1, once issued, can be used infinitely. Management information to be recorded in the management information column 3 is used for the first system to determine whether the credit card 1 can be used or not prior to the full registration of all the necessary information in the member master file in the second system 2. Therefore, the nature of such management information may be selected as desired insofar as it can fulfill such a purpose. For example, the management information to be recorded in the management information column 3 may be the date of issuance of the credit card 1, and the first system may calculate the period of time that has elapsed from the recorded date of issuance until the date of use as a basis for judging the credit card 1. Alternatively, rather such date information, the limit amount of money assigned to the credit card 1 may be recorded in the management information column 3, and the first system may determine whether the payment which the customer wishes to make with the credit card 1 is in excess of the recorded limit amount of money, and send the resulting data to the second system to judge the credit card 1.

Figure 4:
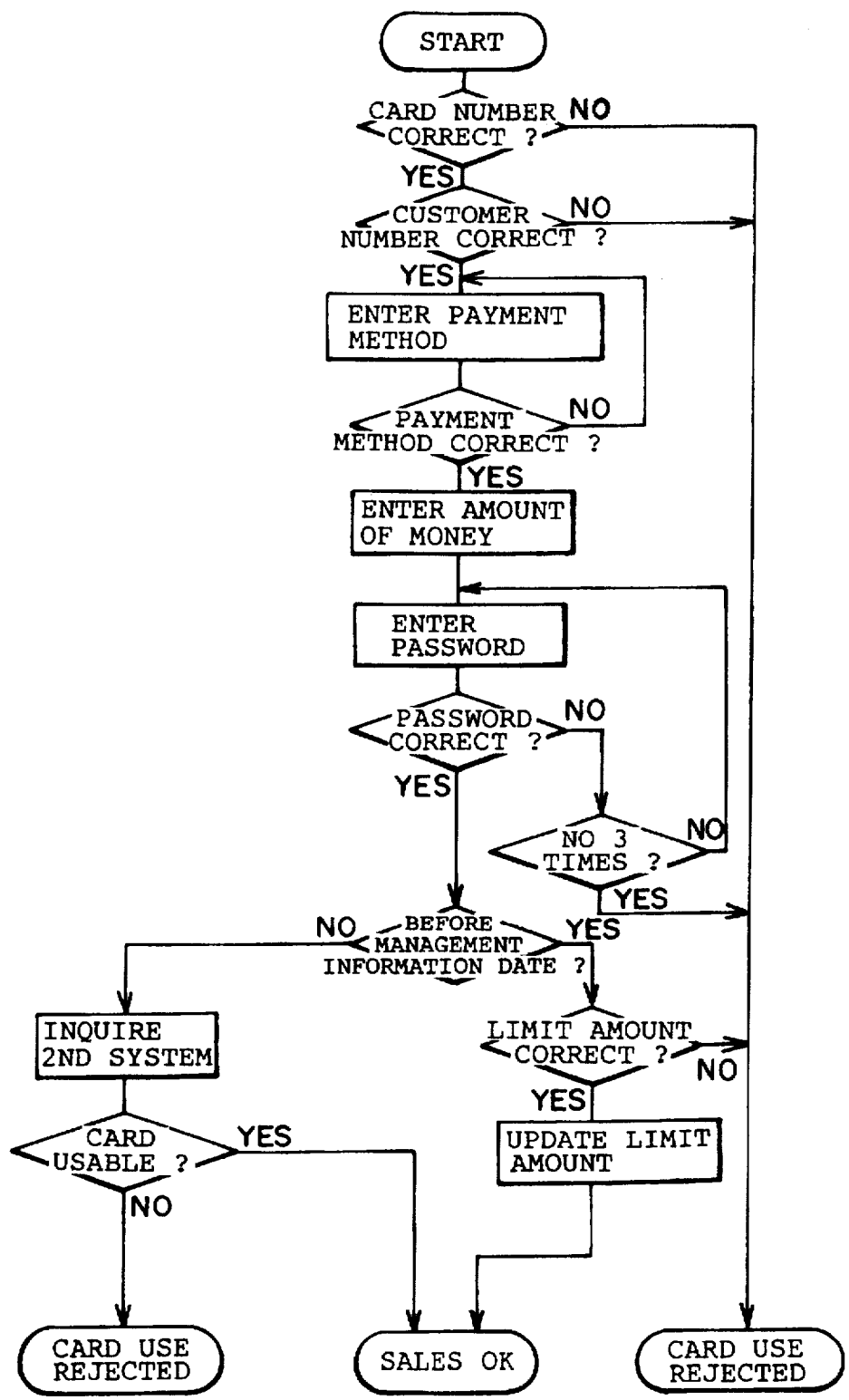
FIG. 4 is a flowchart of a processing sequence of the credit card system shown in FIG. 1.

When the customer is to purchase goods with the credit card 1, the customer asks the retail store to buy goods with the credit card 1. The person in charge in the retail store receives and inserts the credit card 1 into the card reader/writer 12. As shown in FIG. 4, the first system processor 10 checks the identification number of the credit card, the identification number of the customer, and checks the use expiration date and the store code. Then, the first system processor 10 checks the numerical value recorded in the management information column 3. In the illustrated embodiment, since the date two weeks ahead of the date of issuance is recorded in the management information column 3, the first system processor 10 determines whether the date of use is prior to the recorded date or not. If the date of use is prior to the recorded date, then the first system processor 10 displays a prompt on the display unit 13 to enter the amount of money to be paid with the credit card 1. When the person in charge enters the amount of money to be paid and a payment method, the first system processor 10 ascertains whether the amount of money to be paid is less than the recorded limit amount of money or not. If not, then the first system processor 10 displays information indicative of rejection of sales on credit on the display unit 13. If the amount of money to be paid is less than the limit amount of money, then the first system processor 10 prompts the person in charge to enter the password. If the entered password agrees with the password on the credit card 1, then the first system processor 10 allows sales on credit, subtracts the amount of money to be paid from the limit amount of money, updates the limit amount recorded in the limit amount column 4, and returns the credit card 1.

If the date of use is after the date recorded in the management information column 3, then the first system processor 10 does not make any judgment as to whether the proposed purchase with the credit card 1 is permissible or not, but sends an inquiry, with the identification numbers and the proposed amount of money, to the second system to decide whether the proposed purchase with the credit card 1 is permissible or not. The inquiry may be made on-line through the communication adapters 15, 25 or off-line through the facsimile devices 31, 32. If all the necessary information has already been registered in the member master file by this time, the second system processor 20 checks the member master file for the remaining amount of money available for purchase on credit, the history of past payments (payment delay information), invalid data, etc., determines whether the proposed amount of money is less than the present limit amount of money or not, and sends an answer to the first system. Then, based on the transmitted answer, the person in charge at the first system allows or rejects the purchase with the credit card 1. If the registration of all the necessary information in the member master file has not yet been completed for some reason, the second system indicates the incomplete registration to the first system, which then determines whether the purchase with the credit card 1 is permissible or not based on the information recorded in the management information column 3 as described above.

Before all the necessary information is registered in the member master file in the second system, the issued credit card 1 functions as a credit card with the amount of money (e.g., 300,000 yen) recorded as a limit amount in the limit amount column 4. Insofar as the amount of money to be paid with the credit card 1 is less than the limit amount money recorded in the limit amount column 4, the customer can use the credit card 1 repeatedly without the need for a credit card application procedure or a credibility inquiry each time the customer buys goods with the credit card 1. When the limit amount of money is used up for a certain period of time before all the necessary information is registered in the member master file in the second system, the customer can no longer use the credit card 1. Therefore, the customer is prevented from suffering debts in the excess of the limit amount of money or multiple debts using the same credit card 1. If the limit amount of money is set to a relatively small amount of money, then the credibility investigation carried out by the second system is simplified, and a credit card can be issued immediately upon request.

After all the necessary information is registered in the member master file in the second system, the issued credit card 1 functions as an ordinary credit card which, upon each purchase, is not restricted by the limit amount of money initially recorded on the credit card 1, but will need a check based on the information in the member master file in the second system. Consequently, the credit card 1 that has been issued immediately upon request from the customer can be used as a continuously usable credit card.

The management information and other information are recorded on the credit card 1 in the above embodiment. According to another embodiment, the information with respect to the dates and the limit amount of money is not registered on the credit card 1, but stored in the memory 14 of the first system. In this case, the management information may be the date of issuance of the credit card 1 or the limit amount of money assigned to the credit card 1.

Figure 5:
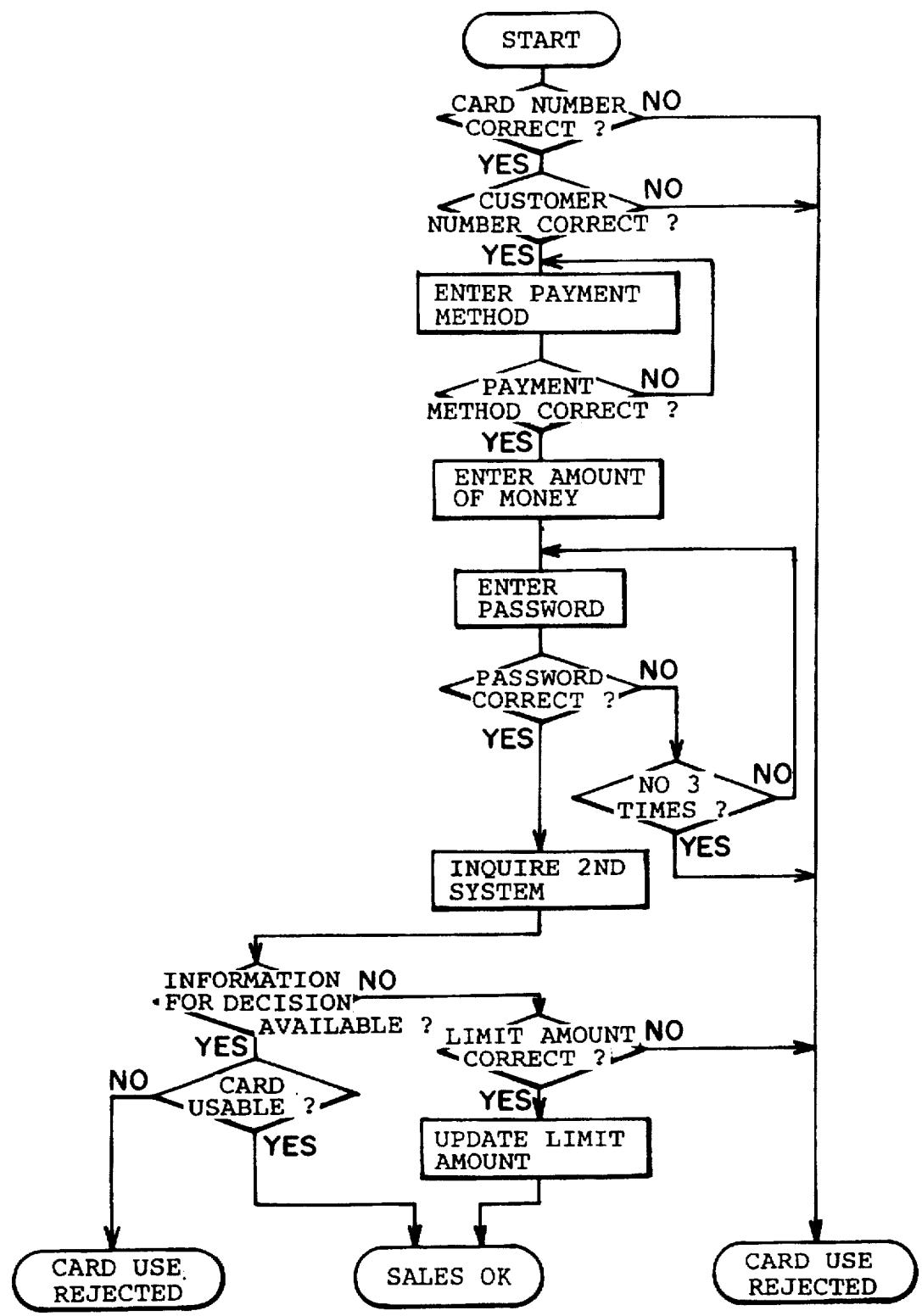
FIG. 5 is a flowchart of a processing sequence of a credit card system according to another embodiment of the present invention.

FIG. 5 shows a processing sequence of a credit card system according to still another embodiment of the present invention. The credit card system according to this embodiment has the same hardware arrangement as that of the credit card system shown in FIG. 1. According to the operation sequence shown in FIG. 5, the first system does not check the management information recorded in the management information column 3. Instead, the first system inquires the second system about whether the use of the credit card is permissible or not each time the customer proposes a payment with the credit card. If the registration of all the necessary information in the member master file has not yet been completed, the second system indicates the incomplete registration to the first system, which then determines whether the purchase with the credit card is permissible or not. If all the necessary information has already been registered in the member master file by this time, the second system processor 20 determines whether the purchase with the credit card is permissible or not, and indicates the result to the first system. The basis for determining whether the purchase with the credit card is permissible or not is the same as that which is described above with respect to the credit card system according to the embodiment shown in FIGS. 1 through 4.

According to yet still further embodiment of the present invention, the first system checks its own management information and/or the management information of the credit card each time the credit card is used, and determines whether the purchase with the credit card is permissible or not if the checked management information the decision by the first system itself. When the second system has completed the member master file and is capable of managing the credit card, the second system indicates its credit card managing capabilities to the first system, which then modifies its management information to indicate that the second system will determine whether the credit card can be used or not. Thereafter, the second system make a decision about usability of the credit card.

According to the present invention, although the first system that is located in the retain store may be of a small size, the credit card system allows the first system to issue a credit card immediately on site and also to sell goods on credit. Once all the necessary information is registered in the member master file in the second system, the credit card which is issued immediately on site by the credit card system can continuously be used like conventional credit cards.

Although certain preferred embodiments of the present invention have been shown and described in detail, it should be understood that various changes and modifications may be made therein without departing from the scope of the appended claims.

What is claimed is:

1. A credit card system comprising:
   a card having at least identification information and management information recorded thereon;
   a first system for determining whether a credit card can be used; and
   a second system for determining whether a credit card can be used;
   the first system comprising:
   recording means for recording management information on the credit card, where the management information allows the first system to refer to a reference date ahead of an issuance date;
   communications means for communicating with the second system;
   reader means for reading the identification information and the management information recorded on the credit card;
   decision means for determining whether the credit card can be used;
   judgement means for judging whether usability of the credit card is to be determined by the first system or the second system based on the management information recorded on the credit card;
   means for inquiring of the second system the usability of the credit card through the communication means if the judgement means determines the second system should make the decision; and
   means for indicating whether the credit card can be used; and
   the second system comprising:
   generating means for generating a member master file;
   decision means for determining whether the credit card can be used based on the member master file;
   means for indicating to the first system whether the member master file is completed; and
   means for indicating whether the credit card can be used.

2. A credit card system comprising:
   a card having at least identification information recorded thereon;
   a first system for determining whether a credit card can be used; and
   a second system for determining whether the credit card can be used;
   the first system comprising:
   memory means for storing the management information of the credit card;
   recording means for recording management information on its memory means when the credit card is issued, where the management information allows the first system to refer to a reference date ahead of an issuance date;
   communications means for communicating with the second system;
   reader means for reading the identification information recorded on the credit card;
   decision means for determining whether the credit card can be used;
   judgement means for judging whether usability of the credit card is to be determined by the first system or the second system based on the management information recorded on the credit card;
   means for inquiring the second system of the usability of the credit card through the communication means, if judgement means determines the second system should make the decision; and
   means for indicating whether the credit card can be used; and
   the second system comprising:
   generating means for generating a member master file;
   decision means for determining whether the credit card can be used based on the member master file;
   means for indicating to the first system whether the member master file is completed; and
   means for indicating whether the credit card can be used.

3. A credit card system comprising:
   a card having at least identification information recorded thereon;
   a first system for determining whether a credit card can be used; and
   a second system for determining whether the credit card can be used;
   the first system comprising:
   communications means for communicating with the second system;
   reader means for reading the identification information recorded on the credit card;
   inquiry means for inquiring the second system of the usability of the credit card through the communication means;
   decision means for determining the usability of the credit card if the second system does not indicate the usability; and means for indicating whether the credit card can be used; and the second system comprising:
generating means for generating a member master file;
decision means for determining whether the credit card can be used based on the member master file;
means for indicating to the first system whether the member master file is completed; and
means for indicating whether the credit card can be used.

4. A method of using a credit card with a credit card system, the credit card system comprising:
a first system for primarily managing justifiability of a credit card;
a second system for primarily managing credit information of a customer; and
a credit card having storage means for storing at least identification information and management information therein;

the first system comprising:
recording means for recording management information on the credit card, where the management information allows the first system to refer to a reference date ahead of an issuance date;
communication means for communicating with the second system;
reader means for reading the identification information recorded and the management information stored in the storage means of the credit card;
decision means for determining whether the credit card can be used; and
judgement means for judging whether the usability of the credit card is to be determined by the first system based on the management information stored in the storage means of the credit card;

the second system comprising:
generating means for generating a member master file;
decision means for determining whether the credit card can be used based on the member master file;
means for indicating to the first system whether the member master file is completed; and
means for indicating whether the credit card can be used;

the method comprising the steps of:
indicating whether the credit card can be used as determined by the decision means, if the judgement means judges that the first system should make the decision;
inquiring the second system about usability of the credit card through the communication means, if the judgement means judges that the second system should make the decision; and
indicating whether the credit card can be used as determined by the second system.

5. A method of using a credit card with a credit card system, the credit card system comprising:
a first system for primarily managing justifiability of a credit card;
a second system for primarily managing credit information of a customer; and
a credit card having storage means for storing at least identification information and management information therein;

the first system comprising:
memory means for storing the management information of the credit card;
recording means for recording management information on its memory means when the credit card is issued, where the management information allows the first system to refer to a reference date ahead of an issuance date;
communication means for communicating with the second system;
reader means for reading the identification information recorded and the management information stored in the storage means of the credit card;
decision means for determining whether the credit card can be used; and
judgement means for judging whether the usability of the credit card is to be determined by the first system based on the management information stored in its memory means;

the second system comprising:
generating means for generating a member master file;
decision means for determining whether the credit card can be used based on the member master file;
means for indicating to the first system whether the member master file is completed; and
means for indicating whether the credit card can be used;

the method comprising the steps of:
indicating whether the credit card can be used as determined by the decision means, if the judgement means judges that the first system should make the decision;
inquiring the second system concerning usability of the credit card through the communication means if the judgement means judges that the second system should make the decision; and
indicating whether the credit card can be used as determined by the second system.

6. A method of using a credit card with a credit card system comprising:
a card having at least identification information recorded thereon;
a first system for determining whether a credit card can be used; and
a second system for managing information to determine whether the credit card can be used;

the first system comprising:
communication means for communicating with the second system;
reader means for reading the identification information recorded on the credit card;
decision means for determining whether the credit card can be used;
inquiry means for inquiring the second system about usability of the credit card through the communication means; and
judgment means for judging whether usability of the credit card is to be determined by the first system based on the decision of the second system;

the second system comprising:
generating means for generating a member master file;
decision means for determining whether the credit card can be used based on the member master file;
means for indicating to the first system whether the member master file is completed; and
means for indicating whether the credit card can be used;

the method comprising the steps of:
indicating or displaying resultant data as to whether the credit card can be used as determined by the decision means if the judgment means judges that usability of the credit card is to be determined by the first system based on the response from the second system after the inquiry means inquires the second system about usability of the credit card through the communication means;

indicating or displaying resultant data as to whether the credit card can be used as determined by the second system if the judgment means judges that usability of the credit card is not to be determined by the first system.

7. A credit card system according to any one of claims 1 2, 3, or 4, wherein the credit card and/or the first system has a limit amount column for recording a limit amount of money at the time the credit card is issued;

further comprising:
   means for updating the limit amount of money recorded initially in the limit amount column, decreasing it as the credit card is used;

the decision means comprising:

means for determining whether the credit card can be used based on resultant data produced by comparison between the limit amount of money recorded in the limit amount column and an amount of money of the proposed credit card expenditure.

8. A method according to any one of claims 2, 3, or 4, wherein the credit card and/or the first system has a limit amount column for recording a limit amount of money at the time the credit card is issued;

the first system further comprising:
   means for updating the limit amount of money recorded initially in the limit amount column, decreasing it as the credit card is used;

the method further comprising:
   the step of determining whether the credit card can be used based on resultant data produced by comparison between the limit amount of money recorded in the limit amount column and an amount of money of the proposed credit card expenditure.

* * * * *